United States Patent [19]

Hopwood

[11] Patent Number: 5,459,922

[45] Date of Patent: Oct. 24, 1995

[54] LOADING APPARATUS AND METHODS

[75] Inventor: Robert T. Hopwood, Cheltenham, United Kingdom

[73] Assignee: TBS Engineering Limited, Cheltenham, United Kingdom

[21] Appl. No.: 360,713

[22] PCT Filed: May 17, 1994

[86] PCT No.: PCT/GB94/01053

§ 371 Date: Dec. 21, 1994

§ 102(e) Date: Dec. 21, 1994

[87] PCT Pub. No.: WO94/27897

PCT Pub. Date: Dec. 8, 1994

[30] Foreign Application Priority Data

May 29, 1993 [GB] United Kingdom ............... 9311186

[51] Int. Cl.⁶ ........................................................ H01M 2/10
[52] U.S. Cl. ............................................. 29/623.1; 29/730
[58] Field of Search ........................... 29/623.1, 730, 29/731; 271/3, 8.1, 9

[56] References Cited

U.S. PATENT DOCUMENTS 4,887,350 12/1989 Hopwood .
5,407,450 4/1995 Rose et al. ........................... 29/730

Primary Examiner—Stephen Kalafut
Assistant Examiner—M. Nuzzolillo
Attorney, Agent, or Firm—Young & Thompson

[57] ABSTRACT

This invention relates to apparatus 10 and methods for loading groups of battery plates or the like in adjacent cells 1 to 6 in a holder. The apparatus includes guide means 13 which defines, by means of walls 37, 38, spaces 40 for receiving respective battery groups 30. The walls can be collapsed around the groups 30 in the spaces 40 until the position and spacing corresponds to that of a row cells 1 to 3, in which point in the groups are pushed through the guide means 13 in to the respective cells.

14 Claims, 7 Drawing Sheets 5,459,922

LOADING APPARATUS AND METHODS

LOADING APPARATUS AND METHODS

This invention relates to apparatus and methods for loading groups of battery plates or the like in adjacent cells in a holder.

During the manufacture of industrial and vehicle batteries, it is necessary to insert groups of plates into cells within a battery box. It can also be necessary to insert groups of plates into processing and manufacturing equipment. In many batteries the cells in the box or other holder are arranged side by side and it has been found that it is possible to insert the plates, simultaneously, into alternate cells using a guide defining a series of chutes. The guide is necessary because the plates are a very tight fit in the cell and often spread a little when gripped, thus making insertion difficult. By loading alternate cells it is possible for each chute to extend over the adjacent cell which has not been filled. Such an arrangement is shown in our U.S. Pat. No. 4,887,350.

There are other batteries, such as truck batteries, in which the cells are arranged in two side by side groups of three and in this case alternate cell filling is at best a lengthy procedure and at worst impossible because of the forces which would be applied to the intercedes of the cells.

The present invention is intended to overcome the problem of battery boxes or other holders having this configuration, but it will be understood that it is applicable to any arrangement of cells.

From one aspect the invention consists in apparatus for loading groups of battery plates or the like in adjacent cells in a holder, comprising guide means for defining adjacent spaces, each having a greater cross-section than a cell, means for inserting the groups in respective ones of the spaces, means for contracting the guide means around the groups and for adjusting the spacing of the groups so that the spaces substantially correspond in size and relative position with the cells, means for inserting the guide means in the cells with the groups in the spaces, and means for inserting the groups into the respective cells.

In a preferred embodiment, the means for inserting the groups in the spaces and the means for inserting the groups into the cells are the same and they may comprise means for gripping the sides of the groups and further independent means for holding and/or pushing the upper end of the groups.

From another aspect the invention consists in a method for loading groups of battery plates in adjacent cells in a holder, comprising inserting the groups in adjacent spaces defined by a guide means, each of the spaces having a greater cross-section than a corresponding cell, contracting the guide means around the groups and adjusting the spacing of the groups so that the spaces substantially correspond in size and relative position to the cells, inserting the guide means in the cells with the groups in the spaces and inserting the groups into the respective cells.

From a still further aspect there is provided apparatus for loading groups of battery plates or the like in adjacent cells having a common mid-plane in a holder, comprising at least two gripping means each for gripping a respective group, means for mounting the gripping means for movement towards each other along the plane, contractable guide means for engaging in the respective cells in its contracted position to guide insertion of the plates into the respective cells and for receiving the gripped groups in its expanded condition, means for simultaneously contracting the guide means and moving the gripping means towards each other until the spacing of guide means corresponds to the spacing of the cells, means for engaging the guide means in the cells and means for moving the gripping means through the guide means to load the groups in their respective cells.

In any of the above cases, the guide means may include wall means for defining a series of guide spaces for receiving the groups and these wall means may include a first set of walls lying generally orthogonal to the mid-plane and being mounted for contraction towards each other generally along the line of the plane. The wall means may also include a second set of walls lying generally parallel to the plane and being mounted for contraction by rotating inwardly into the space about respective axes extending generally parallel to the plane of the first set. The first set and/or the second set of walls may be mounted on a pair of rails extending generally parallel to and on either side of the plane.

Spacer means may be mounted on the rails for defining the closest approach of the wall of the first set. The second set of walls may have associated cams for moving them from their expanded position to their contracted position.

The apparatus may further comprise a pair of supports each carrying at least two gripping means and each being movable between a pick-up location and a holder location for co-operating with the guide means to load successive sets of adjacent cells. The apparatus may further define a support park location adjacent one or each of the pick-up and/or holder locations. The gripping means may include means for gripping the sides of the group and means for holding and/or pushing the top of the group.

Although the invention has been defined above it is to be understood it includes any inventive combination of the features set out above or in the following description.

BRIEF DESCRIPTION OF THE DRAWINGS

The invention may be performed in various ways and a specific embodiment will now be described by way of example with reference to the accompanying drawings, in which.

DETAILED DESCRIPTION OF THE INVENTION

Figure 1:
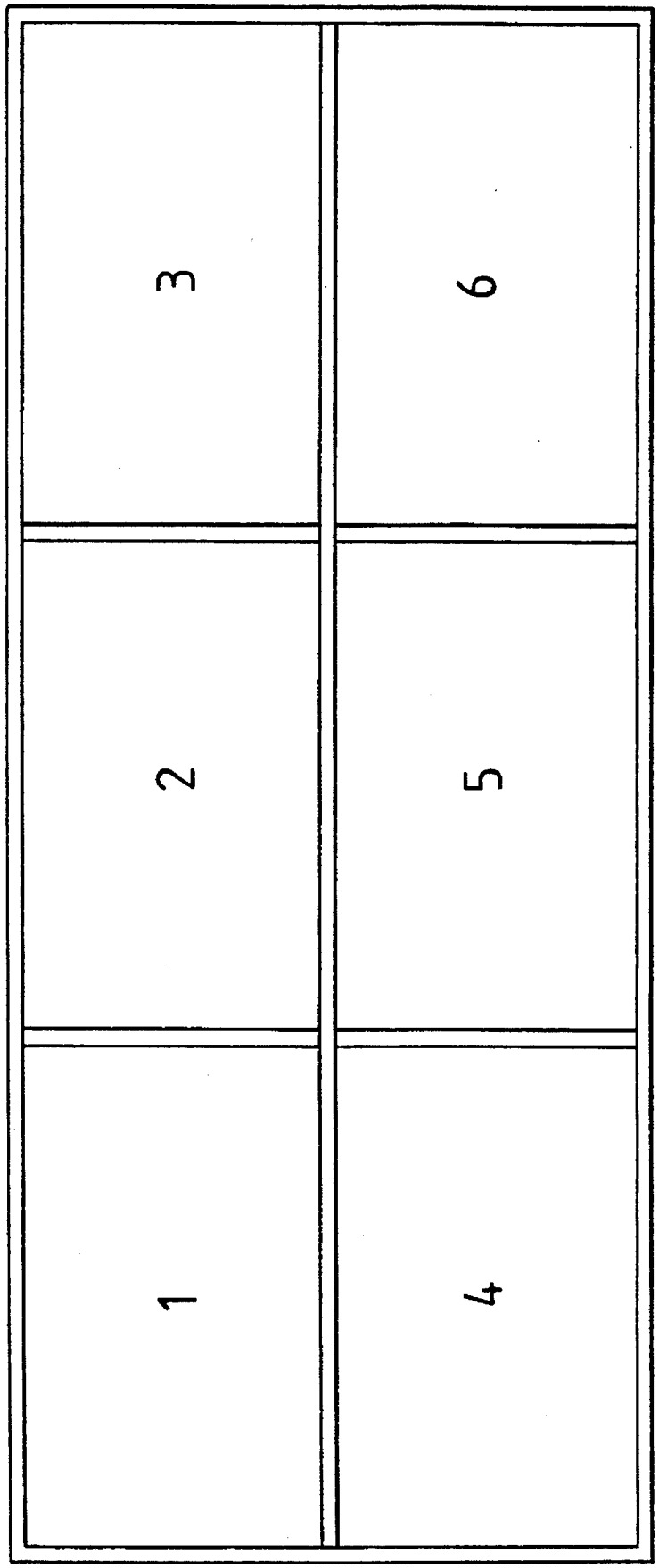
FIG. 1 is a schematic view of a battery box indicating its cell layout.

As has been described above, some battery boxes have cell arrays in which there are two sets of side by side cells. Such an arrangement is illustrated in FIG. 1 and the purpose of the apparatus described below is to simultaneously load cells 1 to 3 and in a second operation cells 4 to 6.

Figure 2:
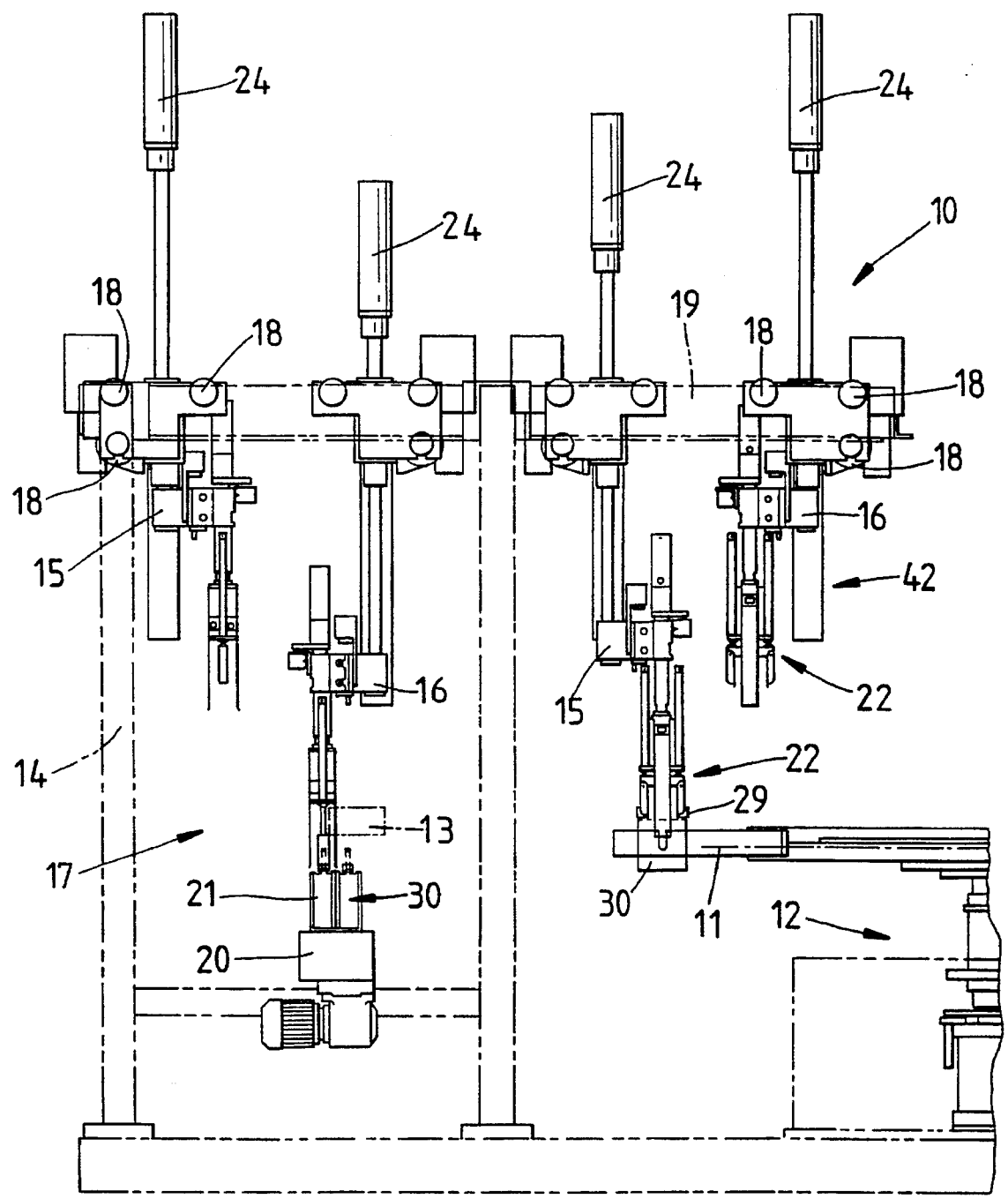
FIG. 2 is a partially schematic side view of apparatus for loading groups of battery plates in a battery box.
Figure 3:
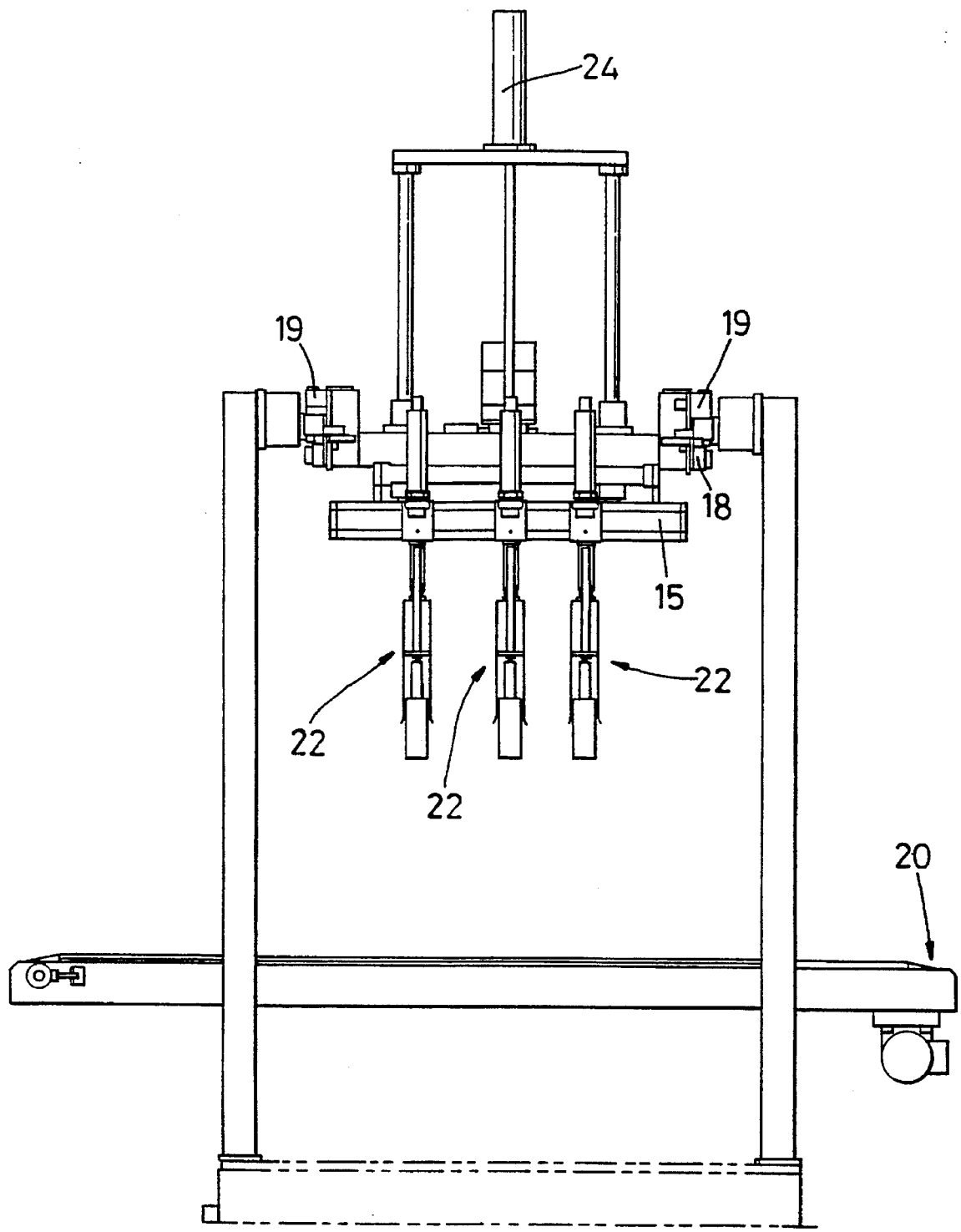
FIG. 3 is an end view of the apparatus of FIG. 2, but with the battery box and the associated apparatus omitted.

The loading apparatus is generally indicated at 10 in FIG. 2 and it is shown in its location relative to a jig box 11 of a strap casting machine 12. It should be understood that the detailed guide mechanism of FIGS. 6 to 7 has been omitted for the sake of clarity but its initial starting position is indicated at 13 in chain line.

The apparatus 10 has a frame 14 on which are carried a pair of beams 15,16. These beams are shown twice each in FIG. 2, to illustrate various operational and rest positions. The beams are movable between the jig box 11 end of the frame 14 and the loading end generally indicated at 17. For this purpose they are mounted on wheels 18 and run on tracks 19. They can be driven by any suitable arrangement as would be well known to one skilled in the art.

A conveyor 20 is located at the loading end 17 of the apparatus 10 and it supports and moves a battery box 21.

Each beam carries three gripping mechanisms 22 which are themselves mounted on the beam for movement along the beam so that their relative spacing can be adjusted. Preferably this movement is achieved by rodless cylinders. Each beam 15,16 is also mounted for up and down vertical movement and the motive force for this movement is supplied by a respective piston 24.

Figure 4:
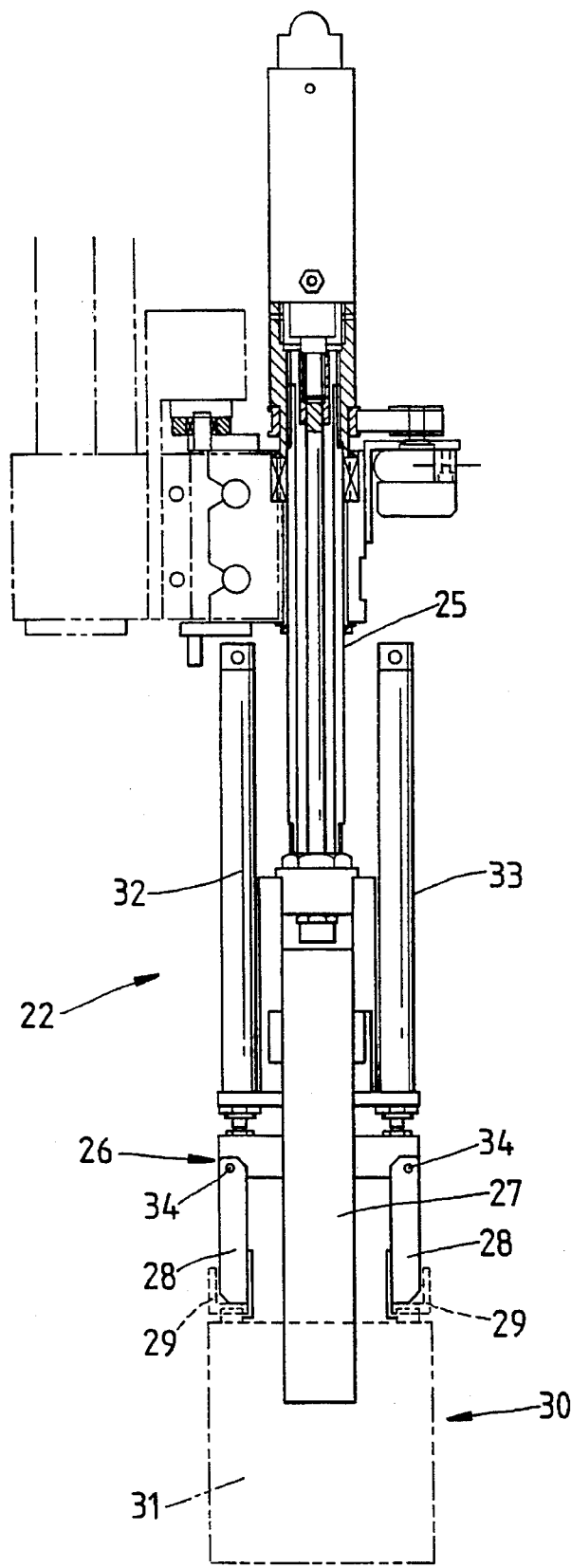
FIGS. 4 and 5 are side views and front views of a gripper of the apparatus of FIG. 2 in one orientation.
Figure 5:
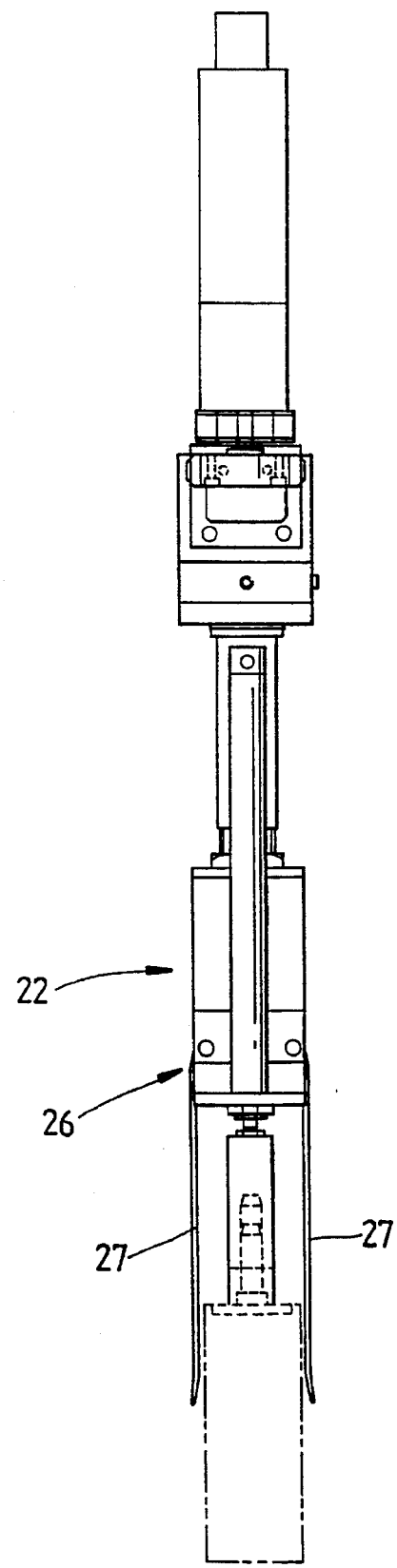

The gripping mechanisms are all identical and, as can be seen in FIGS. 4 and 5, they include an upper piston element 25 to the lower end of which is attached a gripping head 26. The gripping head 26 essentially includes two gripping mechanisms: first a pair of flexible plates 27 which can be moved towards and away from each other by a toggle or other suitable mechanism, and secondly a pair of hook elements 28 which can locate beneath the straps 29 of a cast-on strapped group 30 of plates 31. The gripping head 26 can be rotated about the vertical axis with respect to the piston 25.

It will be noted that the gripping head 26 also includes a pair of further pistons 32,33. As will be seen below in connection with the description of FIG. 9, the piston 32 can be used to raise and lower the hook elements 28 relative to the gripping plates 27, whilst the piston 33 can be used to engage and disengage the hook elements from the group 30 by pivoting them about a respective axes 34. The gripping head also includes a pusher plate 26a for engaging the groups 30.

Figure 6:
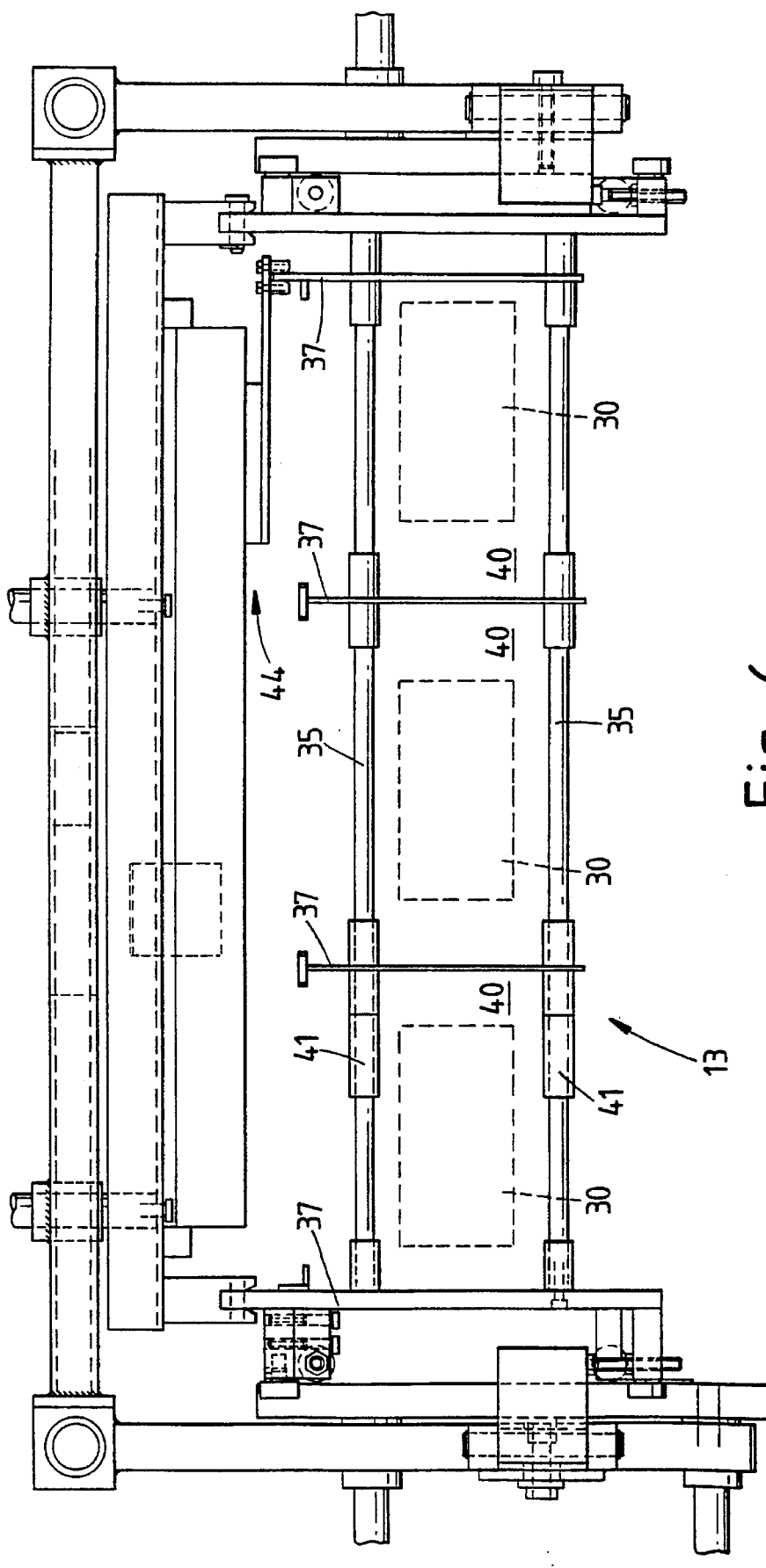
FIG. 6 is a plan view of a guide mechanism of the apparatus of FIG. 2.
Figure 7:
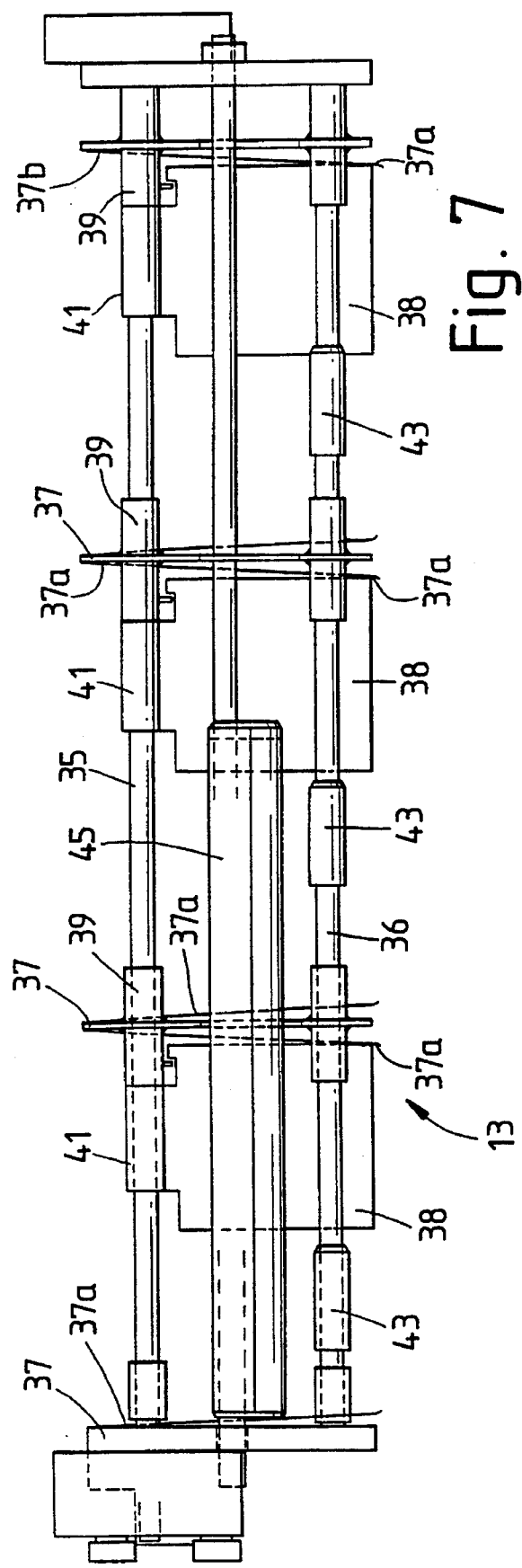
FIG. 7 is a side view of the guide mechanism of FIG. 6.
Figure 8:
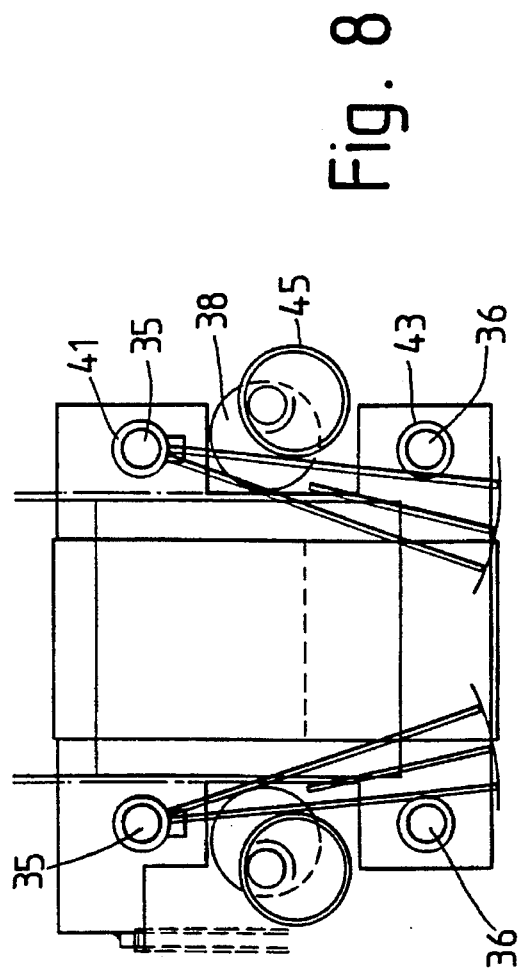
FIG. 8 is an end view of the guide mechanism of FIG. 6 and FIG. 7.

Turning to FIGS. 6 to 8, the guide means 13 essentially comprises a frame of four rods 35,36 which extend along the corners of an imaginary rectangular box and which carry first and second sets of walls 37,38. The first set of walls 37 extend laterally with respect to the rods and, all but the left hand most one, are mounted between them on spacers 39, which are free to run along the rods 35,36. As can be seen in FIG. 7 the walls 37 carry spring-loaded plates 37a which extend into each of the respective spaces 40 defined between the walls 37.

Walls 38 extend generally parallel to the rods 35 and are pivotally mounted thereon; there being a pair of walls 38 for each space 40 defined between the walls 37. The upper ends 41 of the walls 38 act as further spacers and corresponding complimentary spacers 43 are mounted on the lower rods 36. The endmost wall 37b of the walls 37 is connected to a rodless cylinder 44 so that it can be pulled along the rods 35,36 in a sense to reduce the longitudinal dimensions of the spaces 40. As this movement takes place the spacers 39, on the walls 37, engage the upper ends 41 of the walls 38 in the first of the spaces 40 and these in turn engage the next wall 37b until all the walls and spacers are pushed up tight against each other.

As can best be seen in FIG. 8 respective rotatable cams 45 lie just outside each of the walls 38. When the cams 45 are rotated the walls 38 are pushed into their respective spaces 40 to narrow their lateral dimension at least at its lower end.

In use the beams 15,16 start off in the position shown at the right-hand side of FIG. 2. That is beam 16 is in a park position 42, whereas beam 15 is located over the jig box 11. In this position its gripping mechanisms 22 can be lowered into the jig box 11 to pick-up groups 30 by engaging the gripping plates 27 along the sides of the groups 30 and by hooking the elements 28 beneath the straps 29 on the respective groups. The gripping mechanisms 22 are then raised and the beam is transported from right to left until it lies over the right-hand group of cells 1 to 3 in the box 21. During this movement the gripping heads 26 are rotated through 90° so that the orientation of the groups 30 are correctly aligned for the cells 1 to 3. At this point the guide 13 is positioned above the box 21 but below the gripping mechanisms 22.

The gripping mechanisms 22 are then lowered until their groups 30 lie within the spaces 40, as illustrated in chain line in FIG. 6.

Rodless cylinder 44 is then driven right to left (as seen in FIG. 6) causing the contraction of the guide means 13 as described above. The groups 30 may be driven sideways by the walls 37, or alternatively they may be separately or simultaneously driven by an appropriate rodless cylinder. In this later case the gripping mechanisms 22 on a single beam may be linked by chains or the like. The cams 45 also rotate so that at the end of this stage each group 30 is completely enclosed within its guide space and the groups or the like are positioned with the exact spacing of the cells 1 to 3 in the box 21. Further the lower edges of the spaces 40 now have essentially the dimensions of the cells.

Figure 9:
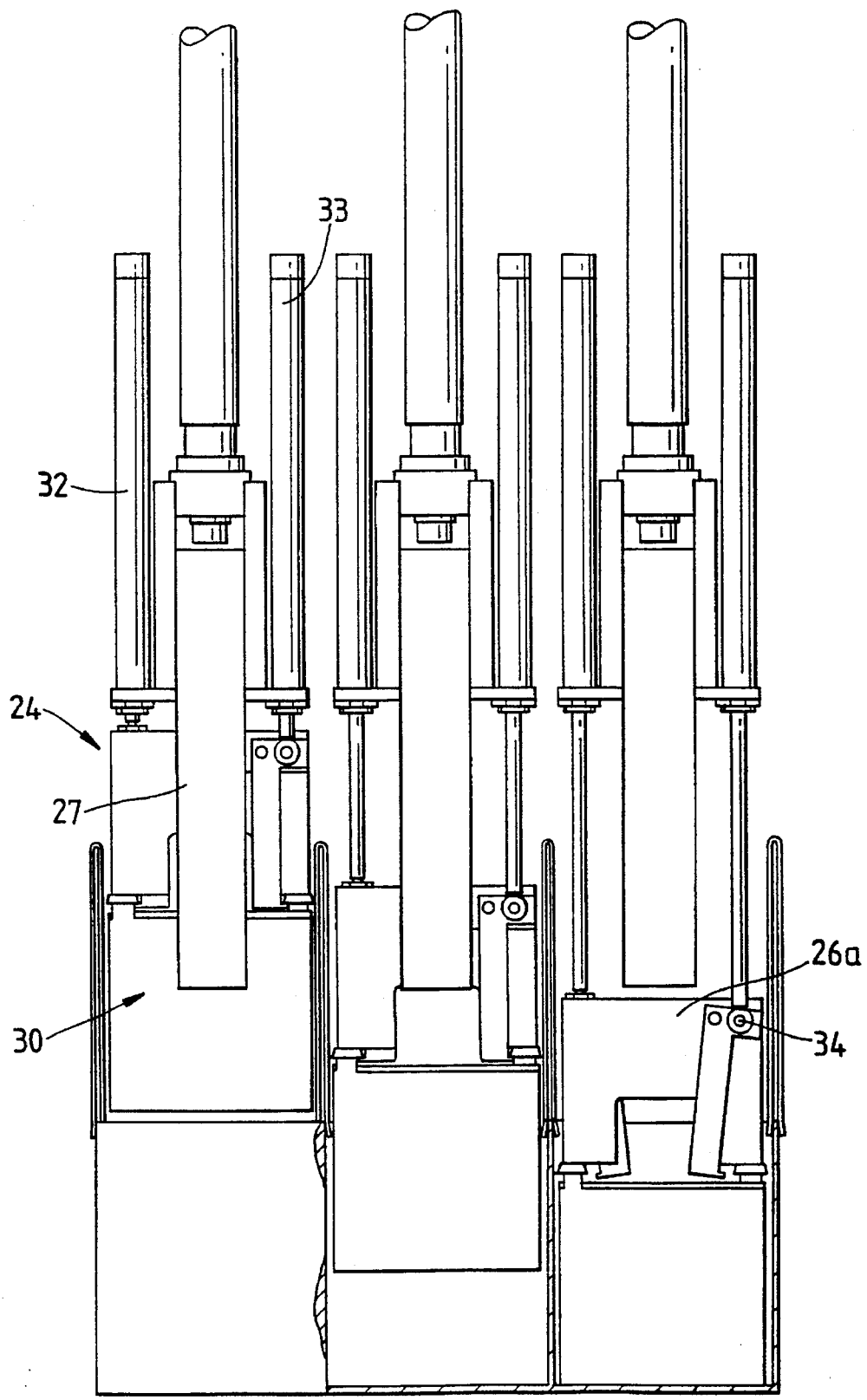
FIG. 9 is a diagrammatic illustration of the battery groups being loaded into a battery box; each cell is from left to right, showing a successive stage in the operation.

The guide means 13 and gripping mechanisms 22 are then lowered onto the top of the battery box and, as can be seen in the left-hand cell in FIG. 9, the plates 37a engage neatly in the mouths of the cells 1 to 3 as do the lower edges of the walls 38. At this point the gripping plates 27 can be released and the groups 30 can either be simply dropped into the cells 1 to 3 by releasing the hook elements 28 or they can be driven down by piston 32 and then subsequently released by piston 33 as indicated in FIG. 9. The beam 15 then moves into the second park position indicated at the left-handmost side of FIG. 2.

In the meantime, beam 16 has been following on behind and by the time beam 15 is moved into the park position, beam 16 is ready above cells 4 to 6 and the guide means has been moved to extend above them. This is the position illustrated on the right hand side of FIG. 2.

Although the apparatus described above is somewhat complex, the essence of its operation is simple. By providing expandable and contractable guide means which can be engaged around the groups, while they have a spacing which is greater than the spacing of the cells, and then contracting the guide means and the spacing down to that corresponding to that of the cells, the guide can be easily inserted into all of the adjacent cells, without the sections for one cell interfering with those of the other. There are various ways in which such a guide means could be configured and all of them are included within the invention. That described is particularly suitable when the apparatus 10 is used in conjunction with other apparatus produced by the Applicant.

I claim:

1. Apparatus for loading groups of battery plates in adjacent cells having a common mid-plane in a holder, comprising guide means for defining adjacent spaces, each space having a greater cross-section than a cell, means for inserting the groups in respective spaces, means for contracting the guide means and for adjusting the spacing of the groups so that the spaces substantially corresponding in size and relative position with the cells, means for inserting the guide means in the cells with the group in the spaces and means for inserting the groups into respective cells.

2. Apparatus as claimed in claim 1 wherein the means for inserting the groups into the spaces and the means for inserting the groups into the cells are the same.

3. Apparatus as claimed in claim 1 wherein the group inserting means comprise means for gripping the sides of the groups and further independent means for holding and/or pushing an upper end of the groups.

4. A method for loading groups of battery plates adjacently in a holder comprising inserting the groups within adjacent spaces defined by a guide means, each of the spaces having a greater cross-section than a corresponding cell, contracting the guide means around the groups and adjusting the spacing of the groups so that the spaces substantially corresponding in size and relative position with the cells, inserting the guide means in the cells with the groups in the spaces and inserting the groups into the respective cells.

5. Apparatus for loading groups of battery plates in adjacent cells having a common mid-plane in a holder, comprising at least two gripping means each for gripping a respective group, means for mounting the gripping means for movement towards each other along the plane, contractable guide means for engaging in the respective cells in its contracted position to guide insertion of the plates into the respective cells and for receiving the gripped groups in its expanded condition, means for simultaneously contracting the guide means and moving the gripping means towards each other until the spacing of gripping means corresponds to the spacing of the cells, means for engaging the guide means in the cells and means for moving the gripping means through the guide means to load the groups in their respective cells.

6. Apparatus as claimed in claim 5 wherein the guide means includes wall means defining a series of guide spaces for receiving the groups.

7. Apparatus as claimed in claim 6 wherein the wall means includes a first set of the walls lying generally orthogonally to the mid-plane and being mounted for contraction towards each other substantially along the line of the plane.

8. Apparatus as claimed in claim 6 wherein the wall means include a second set of walls lying substantially parallel to the plane and being mounted for contraction by rotating inwardly into the space about respective extending substantially parallel to the plane.

9. Apparatus as claimed in claim 8 wherein the first set and/or the second set of walls are mounted on a pair of rails extending substantially parallel to and on either side of plane, 10. Apparatus as claimed in claim 9 further including spacer means mounted on the rails for defining the closest approach of the walls of the first set.

11. Apparatus as claimed in claim 8 wherein the second set of walls have associated cams for moving them from their expanded position to their contracted position, 12. Apparatus as claimed in claim 1 comprising a pair of supports each carrying at least two gripping means and each being movable between a pick-up location and a holder location for cooperating with the guide means to load successive sets of adjacent cells.

13. Apparatus as claimed in claim 8 further defining a support park location adjacent one or each of the pick-up and/or holder location, 14. Apparatus as claimed in claim 13 wherein the gripping means includes means for gripping the sides of the group and means for holding and/or pushing the top of the group.

* * * * *